United States Patent [19]

Sora et al.

[11] Patent Number: 5,729,114
[45] Date of Patent: Mar. 17, 1998

[54] ELECTRONIC FAST-STARTING SYSTEM, PARTICULARLY SUITABLE FOR AN AIR LOOM

[75] Inventors: Gianluigi Sora; Ruggero Manzardo; Vittorio Apolloni; Lucio Sardella, all of Vicenza, Italy

[73] Assignee: Nuovopignone Industrie Meccaniche E Fonderia S.p.A., Florence, Italy

[21] Appl. No.: 362,869

[22] Filed: Dec. 23, 1994

[30] Foreign Application Priority Data

Jan. 20, 1994 [IT] Italy .................. MI94A0071

[51] Int. Cl.⁶ .................................... D03D 51/34
[52] U.S. Cl. .................. 318/801; 318/808; 139/1 E
[58] Field of Search .............. 139/1 E; 318/798–811, 318/778, 607

[56] References Cited

U.S. PATENT DOCUMENTS

| | | | |
|---|---|---|---|
| 4,364,002 | 12/1982 | Suzuki et al. | 318/467 |
| 4,609,858 | 9/1986 | Sugita et al. | 318/778 |
| 4,734,634 | 3/1988 | Kito et al. | 318/778 |
| 4,746,848 | 5/1988 | Maenaka et al. | 318/603 |
| 4,986,483 | 1/1991 | Ryo et al. | 242/45 |
| 5,034,897 | 7/1991 | Sainen | 139/1 E |
| 5,172,732 | 12/1992 | Krumm et al. | 139/1 E X |
| 5,176,184 | 1/1993 | Yamada | 139/1 E X |
| 5,228,480 | 7/1993 | Tamura | 139/1 E |
| 5,293,907 | 3/1994 | Tamura | 139/1 E |
| 5,335,698 | 8/1994 | Berktold et al. | 139/1 E |

FOREIGN PATENT DOCUMENTS

| | | |
|---|---|---|
| 0 442 381 | 8/1991 | European Pat. Off. |
| 643 895 | 6/1984 | Switzerland . |
| 359467 | 11/1931 | United Kingdom . |

*Primary Examiner*—Brian Sircus
*Attorney, Agent, or Firm*—Nixon & Vanderhye P.C.

[57] ABSTRACT

An electronic fast-starting system for a textile loom in which an asynchronous driving motor, whose phase windings are triangularly connected, is mechanically connected to the main crank shaft of the loom and is controlled by an inverter/controller receiving not only the set speed value but also the outlet signal of a speed detector situated on the main crank shaft.

1 Claim, 1 Drawing Sheet

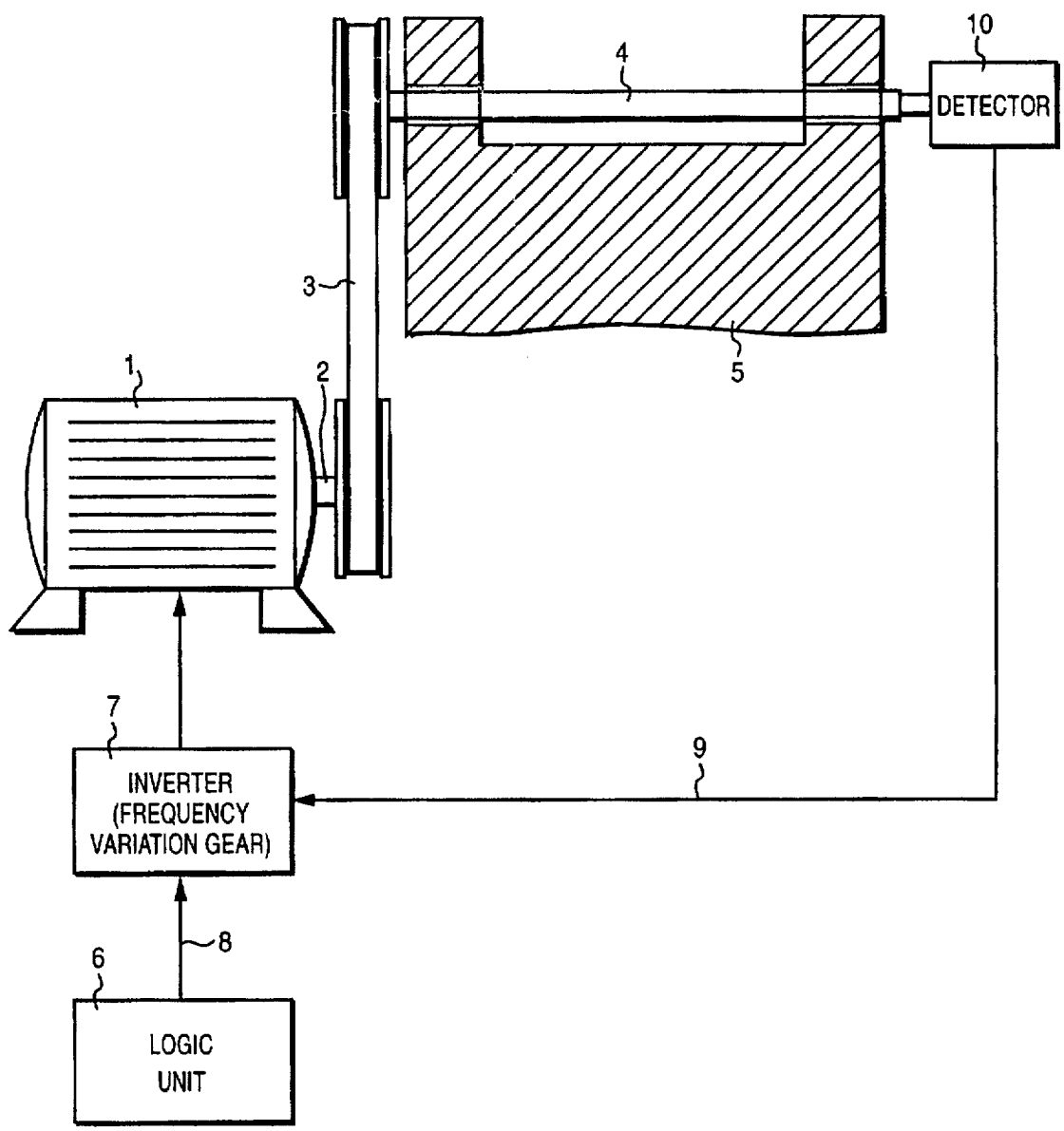

ELECTRONIC FAST-STARTING SYSTEM, PARTICULARLY SUITABLE FOR AN AIR LOOM

BACKGROUND OF THE INVENTION

1. Field of the Invention

The present invention relates to a new electronic system for the fast starting of a textile loom which, by drastically reducing the starting inertia of the loom, thus allowing the standard speed to be rapidly, safely, rationally and above all economically reached, considerably increases the potential of the loom itself with a great reduction of dimensions and costs.

2. Discussion of Background

As is known, to avoid the arising of defects in the fabric being woven, the loom must always function at standard speed. It is obvious, however, that at the start, the inertia period, during which the speed of the main crankshaft of the loom increases from zero to the standard value, must be as short as possible and should preferably end before the first beat-up of the reed after the start.

In the present state of the art, the fast starting of the loom is carried out by a fly-wheel which, after being brought to standard speed by a main asynchronous motor driven by a logical control unit, is connected to the main crankshaft of the loom by a clutch.

This solution, however, apart from having the obvious disadvantages of dimensions and cost due to the necessity of a fly-wheel and clutch, also requires a certain dead time to compensate for the inevitable drop in speed of the main crankshaft of the loom owing to the load inertia caused by the coupling between flywheel and crankshaft by means of the clutch.

This latter drawback has been basically eliminated with the speed control system disclosed in our previous Italian patent application MI93A 002274, filed on Oct. 27, 1993, wherein the main asynchronous motor of the textile loom is driven by a frequency variation gear or so-called inverter/controller, controlled by a logic unit.

Therefore, by varying the frequency leaving the above inverter/controller, it is possible to vary the standard speed of the asynchronous motor and consequently of the fly-wheel and it is therefore possible to increase the speed by as much as is necessary to compensate the above-mentioned drop in speed. In other words, the fly-wheel is made to rotate at a greater speed than the standard rate so that at the moment of its coupling, by means of the clutch, with the main crankshaft of the loom, the loom can rotate at the standard speed required.

However, the system also requires a fly-wheel and consequently also a clutch, which lead to the problems relating to dimensions and cost.

The purpose of the present invention is to overcome all the above disadvantages and therefore provide a system for the rapid starting of a textile loom which, apart from minimizing the inertia period, is neither bulky nor costly.

SUMMARY OF THE INVENTION

According to the present invention both the fly-wheel and clutch are eliminated, and the asynchronous motor is directly connected to the main crankshaft of the loom and has its phase windings triangularly connected to guarantee a high starting torque even at higher rotation speeds. The motor is piloted by a frequency variation gear or inverter/controller which receives both the exit signal of a speed detector assembled on the main crankshaft of the loom and the set or standard speed signal provided by a logic unit. In this way the inverter/controller is basically driven by the difference between the set speed value and the actual speed value at which the main crankshaft rotates, with the consequent linearization of the speed variation curve of the loom during the inertia period whereas the greater starting torque makes this curve more slanting thus reducing the time necessary for reaching the standard conditions.

In short, the electronic system for the rapid starting of a textile loom comprising a main crankshaft, a main asynchronous driving motor, a logical control unit for this motor using an inverter/controller, is characterized according to the present invention in that said asynchronous motor is directly connected to the main crankshaft via a pulley belt and has its own phase windings triangularly connected and the exit signal of a speed detector assembled on the main crankshaft is sent to said inverter.

BRIEF DESCRIPTION OF THE DRAWING

The invention is now explained more clearly with reference to the enclosed drawing which illustrates a preferred practical embodiment which is exemplative but not restricting as various techniques or modifications can be applied without leaving the scope of the present invention.

DETAILED DESCRIPTION OF THE PREFERRED EMBODIMENT

In this drawing, the FIGURE shows a longitudinal, schematic and partial view of a textile loom using the electronic rapid starting system of the invention.

With reference to the FIGURE, 1 indicates the main asynchronous motor of the textile loom, whose phases are triangularly connected and whose crankshaft 2 is directly connected, by pulley 3, to the main crankshaft 4 of the textile loom, which is supported, so as to allow its rotation, by the fixed body 5 of the textile loom itself. The motor 1 is driven by logic control unit 6 by means of a frequency variation gear or inverter/controller 7 to which the set speed value registered in the logical unit 6 is sent, through lead 8, together with, through lead 9, the outlet signal of a speed detector 10 assembled on the above main crankshaft 4.

We claim:

1. An electronic system for fast starting of a textile loom, said system comprising:

a loom main crankshaft;

a main asynchronous driving motor;

an inverter/controller connected directly to said motor, said inverter/controller controlling motor torque during a start-up inertia period to ensure fast starting of said loom;

a logic control unit connected to said motor via said inverter/controller, wherein said asynchronous motor is mechanically connected to said crankshaft and wherein said motor has phase windings triangularly connected; and a speed detector system mounted on said main crankshaft and outputting an outlet signal to said inverter/controller, wherein said inverter/controller controls said motor to provide fast starting of said loom by increasing a starting torque of said motor in accordance with a difference in values between a set speed value provided by said logic unit and a loom main crankshaft speed value provided by said outlet signal of said speed detector system.

* * * * *